(12) United States Patent
Huang

(10) Patent No.: US 7,562,384 B1
(45) Date of Patent: Jul. 14, 2009

(54) METHOD AND APPARATUS FOR PROVIDING A SECURE NAME RESOLUTION SERVICE FOR NETWORK DEVICES

(75) Inventor: Geoffrey Huang, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 687 days.

(21) Appl. No.: 10/383,946

(22) Filed: Mar. 7, 2003

(51) Int. Cl.
G06F 7/04 (2006.01)
G06F 17/30 (2006.01)
G06K 9/00 (2006.01)
H04L 9/32 (2006.01)

(52) U.S. Cl. .......................... 726/5; 713/170
(58) Field of Classification Search ............ 726/1, 726/5
See application file for complete search history.

(56) References Cited

U.S. PATENT DOCUMENTS

| | | | | |
|---|---|---|---|---|
| 5,983,350 | A * | 11/1999 | Minear et al. ............. | 726/11 |
| 7,093,129 | B1 * | 8/2006 | Gavagni et al. ........... | 713/175 |
| 2002/0016926 | A1 * | 2/2002 | Nguyen et al. ............ | 713/201 |
| 2002/0080752 | A1 * | 6/2002 | Johansson et al. ......... | 370/338 |

OTHER PUBLICATIONS

IP Mobility Support; IETF RFC 2002, by C. Perkins, Oct. 1996.*
Address Resolution Protocol (ARP). See http://web.archive.org/web/20021202092748/http://www.erg.abdn.ac.uk/users/gorry/course/inet-pages/arp.html, date of publication: Dec. 2002 according to WayBackMachine.com*
Jacco Tünnisen, "Dnssec.net, Securing the Domain Name System," 2002, 8 pages.
Marshall Brain, HowStuffWorks, Inc., "How Domain Name Servers Work," 1998-2003, 8 pages.
S. Kent, et al., "Security Architecture for the Internet Protocol," Nov. 1998, Network Working Group, Request for Comments: 2401, pp. 1-66.
D. Piper, "The Internet IP Security Domain of Interpretation for ISAKMP," Nov. 1998, Network Working Group, Request for Comments: 2407, pp. 1-32.
D. Harkins, et al., "The Internet Key Exchange (IKE)," Nov. 1998, Network Working Group, Request for Comments: 2409, 37 pages.

(Continued)

*Primary Examiner*—Kambiz Zand
*Assistant Examiner*—Farid Homayounmehr
(74) *Attorney, Agent, or Firm*—Hickman Palermo Truong & Becker LLP

(57) ABSTRACT

Resolving information associated with a network device includes receiving a request for first information associated with the network device. The request includes second information associated with the device, such as identification information. Based on the second information, an entry that includes the first information in association with the second information is located in a security association database. For example, an entry that includes the information association is located in a Security Association Database (SAD) of an IPsec endpoint device. The first information is read from the entry and a response to the request is based on this first information. The association between the first and the second information that is stored in the relevant database may be based on an identification authentication mechanism. Thus, for example, a management station is able to obtain the dynamically assigned network address of an interesting IPsec endpoint device by providing identity information associated with the device.

43 Claims, 5 Drawing Sheets

OTHER PUBLICATIONS

S. Beaulieu, et al., "Extended Authentication within IKE (XAUTH)," Oct. 2001, Internet Draft, Document: <draft-beaulieu-ike-xauth-02.txt>, 39 pages.

Y. Sheffer, et al., "PIC, A Pre-IKE Credential Provisioning Protocol," IPSRA Working Group, Internet-Draft, Category: Standards Track, <draft-ietf-ipsra-pic-06.txt>, Oct. 9, 2002, 29 pages.

* cited by examiner

METHOD AND APPARATUS FOR PROVIDING A SECURE NAME RESOLUTION SERVICE FOR NETWORK DEVICES

FIELD OF THE INVENTION

The present invention generally relates to communication networks. The invention relates more specifically to a method and apparatus for providing a secure name resolution service for network devices.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Secure network "connections," such as an IPsec deployment, are often configured according to a hub-and-spoke architecture. Such networks are established using point-to-point links among routers or switches that participate in the secure network. This is a natural and efficient way to set up encrypted networks since encryption involves establishing a shared secret between the two endpoints so that each endpoint can decrypt what the other endpoint has encrypted. For example, in hub-and-spoke networks in which spokes connect to a central private network, such as an enterprise LAN, via VPN links to a central hub or gateway at an interface to the central network, network traffic passes through the central hub to get to the central network.

Often, the spoke routers are connected to the network via DSL or cable modem links. It is typical for such routers to be assigned a network address dynamically, such as each time they reboot or reload. This scenario is common in VPN remote access deployments, as well as branch office connectivity deployments. Furthermore, network addresses dynamically assigned by network service providers often have a limited life or lease time and, therefore, expire after a certain period. Thus, upon expiration, a new address is often assigned to the device.

In deployments such as described above in which remote access to a central network is provided to multiple spokes, a management station behind the hub, such as an enterprise management station, often needs to connect to the spokes or to entities behind the spokes (collectively, "spoke devices") to collect data or deploy configuration information. In order for a network entity, such as a management station, to connect to spoke devices, the entity needs to know the network address of the spoke devices to which it is connecting. However, as discussed, such network addresses are often dynamically assigned. Furthermore, there is not a strong association between a spoke device's dynamic address and its identity. Hence, the management station has no mechanism for locating a specific spoke of interest. The problem is compounded if the management station wants to identify not only spokes, but the users behind the spokes.

A traditional and common approach to network device address resolution involves use of DNS (Domain Name System). However, DNS has disadvantages. For example, resolution through a DNS server is insecure in that there is not cryptographic assurance that the network device is "who" it claims to be to the DNS server. In addition, traditional DNS is applicable to static address resolution. There are more recent offerings of dynamic DNS services, however, they experience the same shortcomings regarding security as described above.

The Security Architecture for the Internet Protocol and related protocols such as IKE and ISAKMP (collectively referred to as IPsec) provide a standards-based method of providing privacy, integrity, and authenticity to information transferred point-to-point among peers across IP networks, such as the public Internet wide area networks and private local area networks. Key management and security associations are negotiated with the Internet Key Exchange (IKE) protocol. A security association (SA) is a set of IPsec parameters that have been negotiated between two devices.

IPsec protocols define the concept of an IKE identity. IKE identification types ("ID types") are used to identify a network device that is functioning as an IPsec endpoint and are separate from IPsec SA parameters. Such device identities are more "permanent" than network addresses, which, as mentioned, are often and frequently dynamically assigned. Furthermore, as part of an IKE process, IKE identities are cryptographically verified. Therefore, IKE identities are considered more secure than non-verified identities.

Security associations are typically stored at each network device that participates in secure communication using a network security protocol such as IPsec. For example, in the context of IPsec, security associations for secure connections negotiated by a given network device are stored in a Security Association Database (SAD) within the device. Hence, the SAD for a hub device maintains a list of related spokes and their associated SAs. The SAs are uniquely identified by a combination of a Security Parameter Index (SPI), a Destination IP Address (i.e., the spoke device's network address), and a security protocol (such as AH or ESP) identifier. Thus, each spoke device is identified in the SAD by its IP address, with no association with the spoke device's less transient IKE identity. Therefore, for example, if a management station behind a hub wants to connect to "spoke router A" or wants to connect to "Employee B's router," there is no prior mechanism for trusted discovery of the dynamic network addresses of such routers.

Based on the foregoing, there is a clear need for a name resolution mechanism for identifying network devices at or behind secure connection endpoints. There is a more specific need for a name resolution mechanism for identifying such devices with dynamically assigned addresses.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
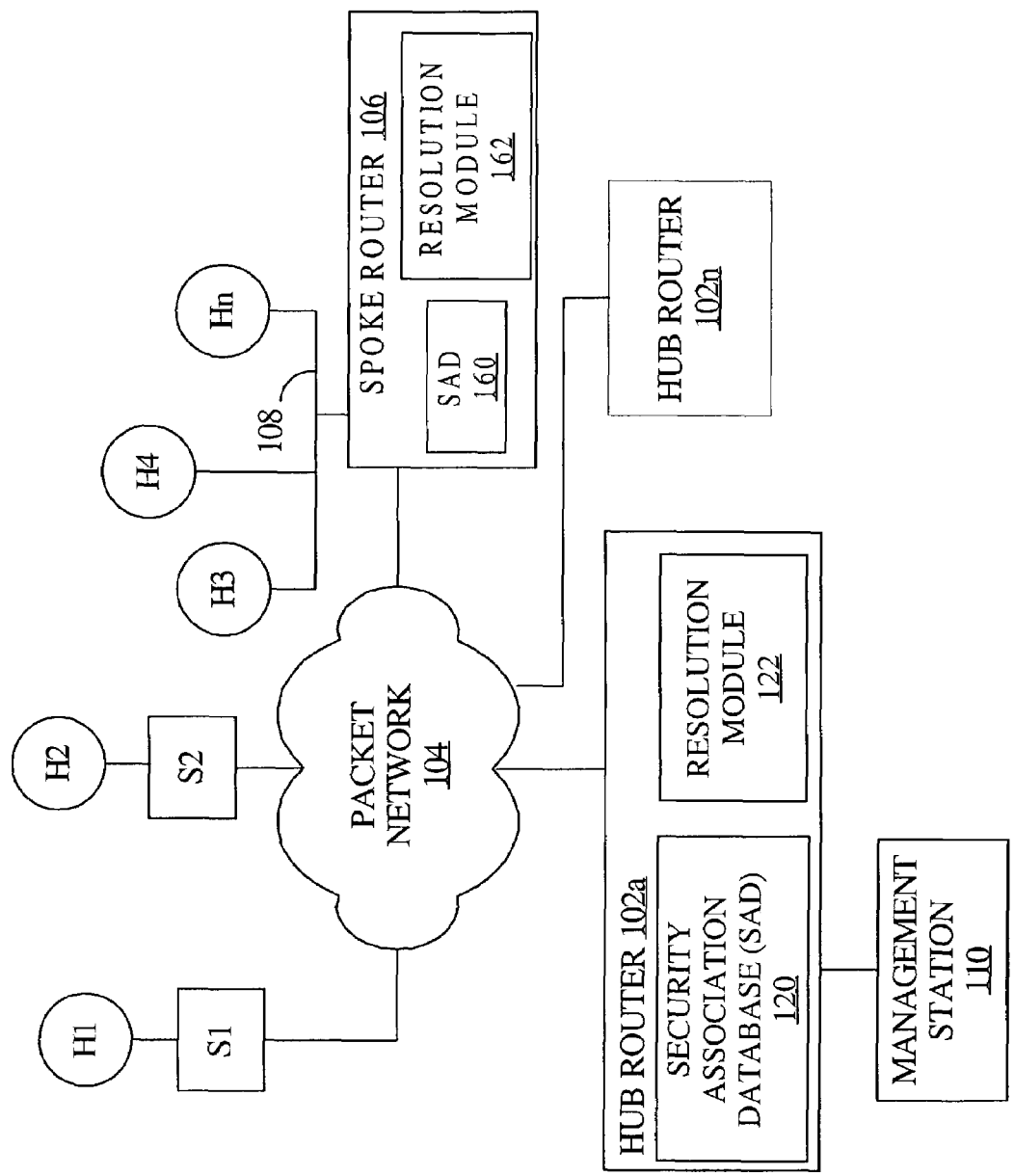
FIG. 1A is a block diagram of an example operating environment in which an embodiment may be implemented.

A method and apparatus providing a secure name resolution service for network devices is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
   2.1 Operating Environment Example
3.0 Method of Providing Secure Name Resolution for Network Devices
   3.1 Process of Associating a Network Device's Dynamically Assigned Network Address With Its Identity
     3.1.1 Identity Information
     3.1.2 Identity Authentication
   3.2 Process of Resolving Information Associated with a Network Device
4.0 Implementation Mechanisms—Hardware Overview
5.0 Extensions and Alternatives

1.0 GENERAL OVERVIEW

According to one aspect, a process for resolving information associated with a network device is disclosed. A request for first information associated with the network device is received. For example, a request for the device's dynamically assigned IP address is received. The request includes second information associated with the device, such as identification information. For example, the request includes information conforming to an IKE identification type, such as a user fully-qualified domain name (FQDN) or a certificate distinguished name (DN).

Based on the second information, an entry that includes the first information in association with the second information is located in a security association database. For example, an entry that includes the information association is located in a Security Association Database (SAD) of an IPsec endpoint device. The first information is read from the entry and a response to the request is based on this first information. For example, a management station behind a hub device is able to obtain the dynamically assigned network address of an IPsec endpoint device by providing a DN associated with the device.

In an embodiment, the association between the first and the second information that is stored in the entry in the SAD associated with the relevant security protocol is based on an identification authentication mechanism, such as the IKE Extended Authentication (XAUTH) protocol. Since IKE and XAUTH are typically considered to be trustworthy protocols that result in trustworthy deployments, name or address resolution processes based on such protocols provide trusted results.

According to one aspect, a process for associating a dynamically assigned network address of a network device and the network device's identity is described. A security association (SA) between the network device and a second network device is negotiated. For example, an IPsec SA is negotiated between a hub router and a spoke router. An entry that associates the dynamically assigned network address with the SA is stored in an SAD associated with the relevant security protocol. Further, an association between the device's identity and the network address is stored in the entry. For example, information is added to the SA entry associated with the hub and spoke, in the SAD of the hub, the spoke, or both. The information added to the SA entry is, in one embodiment, based on the IKE XAUTH protocol.

In an embodiment, access to the entry is allowed for resolution of information associated with the network device, for example, resolution of an IP address based on a DN of the device. Read access may be provided to the network at large, thereby providing a secure name resolution service. For example, a hub router may compile the relevant information from its associated spokes and store it such that the hub, or another device such as a server, can service name resolution requests from unrelated network entities. Since IKE and XAUTH are typically considered to be trustworthy protocols that result in trustworthy deployments, name or address resolution processes based on such protocols provide trusted results.

2.0 STRUCTURAL AND FUNCTIONAL OVERVIEW

2.1 Operating Environment Example

FIG. 1A is a block diagram of an example operating environment in which an embodiment may be implemented. In FIG. 1A, a network device referred to as hub router 102*a* is located in the position of hub for a hub-and-spoke arrangement of other routers S1, S2, and 106. Because of its logical role as a communications hub in such a system, in this description, hub router 102*a* is sometimes termed a hub; however, this terminology is distinct from a hardware hub as known in the networking field for interconnecting end stations, as in an Ethernet hub. Furthermore, embodiments are not limited to use in a hub-and-spoke network arrangement, rather, such an arrangement is presented by way of example.

Hub routers 102*a*, 102*n* are communicatively coupled to a packet-switched network 104 that may contain any number of network infrastructure elements including routers, switches, gateways, etc. Such elements are omitted from FIG. 1A for clarity, because they are not pertinent to the embodiments described herein. In one embodiment, network 104 is a TCP/IP network in which infrastructure elements execute a conventional routing protocol, such as RIP, EIGRP, OSPF, BGP, etc., for routing packets among the infrastructure elements. Although embodiments are described herein with reference to IP addresses and the TCP/IP protocol, implementations are not limited to use of TCP/IP. Rather, other packet-based protocols, even protocols that are not yet developed, are specifically contemplated.

Hub routers 102*a*, 102*n* may comprise any network device capable of communicating securely through implementation of a security protocol, such as the set of protocols collectively referred to as the IPsec protocols. Hub routers 102*a*, 102*n* may also function as security gateways. Hub routers 102*a*, 102*n* collectively represent any number of security gateways, which may further serve as name resolution servers according to embodiments described herein.

The spoke routers S1, S2, 106 also are communicatively coupled to network 104. Each of routers S1, S2, 106 also may route data packets to a local area network, or to other network infrastructure elements. As an example, router 106 receives and routes from and to LAN 108 having multiple hosts H3, H4, Hn. Routers S1, S2, 106 collectively represent any number of routers or other network devices that are capable of communicating securely through implementation of a security protocol, such as IPsec. Routers S1 and S2, for example, are routers deployed at a small office or home office, providing VPN remote access for hosts H1, H2 behind such routers. For example, hosts H1, H2 are laptop or desktop computers and spokes S1, S2 are respective network devices, such as routers, that are internal to or coupled to hosts H1, H2. Router 106, for example, is a router or gateway deployed in a branch office connectivity scenario, and receives and routes packets between the public network 104 and the private LAN 108, to provide network communication to hosts H3, H4, Hn.

For purposes of illustrating a clear example, limited numbers of routers, LANs, and hosts are shown in FIG. 1A. However, in a practical embodiment, there may be any number of such elements, and the use of hundreds or thousands of routers is specifically contemplated.

Hub router 102a further comprises a security association database (SAD) 120 and a resolution module 122. A module such as resolution module 122 comprises one or more computer programs or other software elements for implementing functions described herein. For an example of such functions, resolution module 122 facilitates storage of information that is relevant to processes related to network device resolution, and for retrieval of such information as part of a resolution process. Resolution module 122 may be implemented as a component of an operating system for hub router 102a. Each of spoke routers S1, S2, and 106 are similarly configured with a SAD 160 and a resolution module 162.

Security association database 120 is a database that stores information associated with security associations (SA) that are negotiated between the local network device, such as hub router 102a, and remote devices, such as routers S1, S2, 106 with which the hub router 102a securely communicates using a suitable security protocol. One such SAD 120 is an IPsec SAD, which is described in RFC 2401 (Request For Comment) entitled "Security Architecture for the Internet Protocol," available from the Network Working Group of the IETF (Internet Engineering Task Force) and which is incorporated by reference in its entirety for all purposes as if fully set forth herein.

Information stored in association with one or more SAs in an SAD 120 includes, for example, (1) the destination IP address associated with an IPsec endpoint, such as spokes S1, S2, 106; (2) a Security Parameters Index (SPI), used for indexing the SAs that terminate at the same destination and use the same protocol; and (3) parameters associated with communications based on the respective SA, such as parameters relating to the appropriate security protocol and mode, the encryption algorithm, the SA lifetime, key pairs, and the like. Further, according to embodiments, authenticated identification information associated with the host and/or the user of the host is stored in association with the information typically stored for a given SA.

Figure 1B:
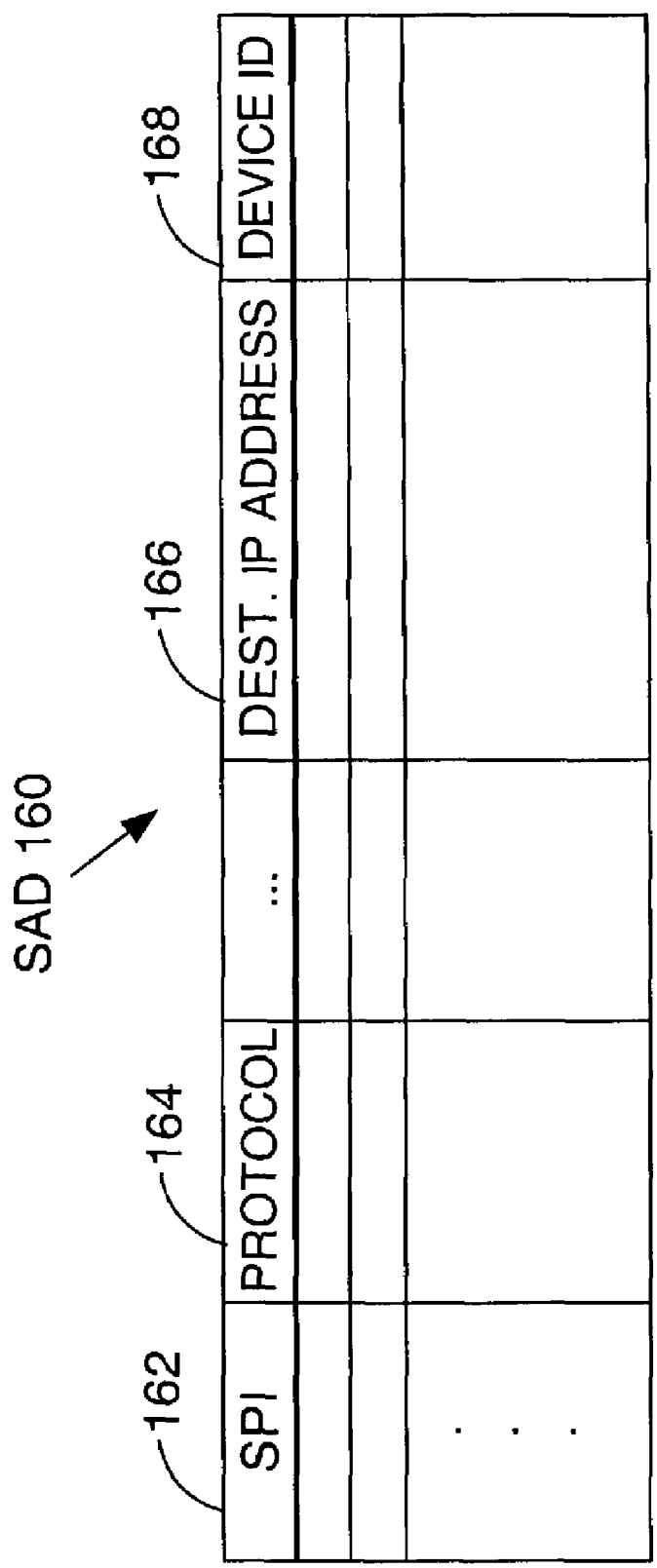
FIG. 1B is a block diagram that illustrates an improved Security Association Database that includes network device identity information.

FIG. 1B is a block diagram that illustrates an improved Security Association Database 160 that includes network device identity information. SAD 160 is illustrated in the form of a table; however, SAD 160 is not limited to table form.

SAD 160 comprises elements which are represented as columns in the table. SPI element 162 and destination IP address 166 are conventional SAD fields, as described above. Protocol element 164 is a conventional SAD field used to specify the security protocol to be applied to secure packets transmitted to the destination address. For example, in the context of IPsec, the protocol may be AH or ESP. SPI element 162, protocol element 164 and destination IP address 166 are used to look up an SA in an SAD, such as SAD 120 (FIG. 1A) or SAD 160.

According to embodiments, SAD 160 additionally comprises device ID element 168, described herein. Device ID element 168 is the authenticated identification information associated with the network device at a secure endpoint that is referred to above and that is stored in association with the conventional information for a given SA. The types of identification information that are stored in device ID element 168, according to embodiments, are described in detail in the section entitled "Identity Information."

An information resolution mechanism is described herein, which is embodied in the SAD 120 and resolution module 122 of hub router 102a. The information resolution mechanism can be implemented in multiple hub routers other than hub router 102a, depicted as hub router 102n. In one embodiment, such a resolution mechanism is implemented in spoke routers S1, S2, and 106.

FIG. 1A further depicts a management station 110 communicatively coupled to hub router 102a. Management station 110 typically comprises a combination of one or more computer programs or other software elements and a computer system, for centrally managing multiple network devices deployed in a network. For example, management station 110 is configured with network management software for managing hub router 102a and spoke routers S1, S2, and 106. Typically, in managing such devices management station 110 collects data from the devices and issues commands to the devices to provision them with configuration information and parameters. An example of suitable commercially available management software is VPNSC from Cisco Systems, Inc., San Jose, Calif.

To manage remote network devices, management station 110 needs to know the network addresses associated with the devices which it is managing. In general, network devices that are assigned addresses dynamically, typically by their respective network service providers, are assigned an address at least upon boot-up or initialization of such devices. Dynamically assigned network addresses typically have a limited life or lease time and, therefore, expire after a certain period. Upon expiration, a new address may be assigned to the device. Hence, a network device may have several network addresses during a certain period of time, for example, during a typical day. Consequently, management station 110 may have a need to determine a managed device's address multiple times during that same period.

3.0 METHOD OF PROVIDING SECURE NAME RESOLUTION FOR NETWORK DEVICES

Figure 2:
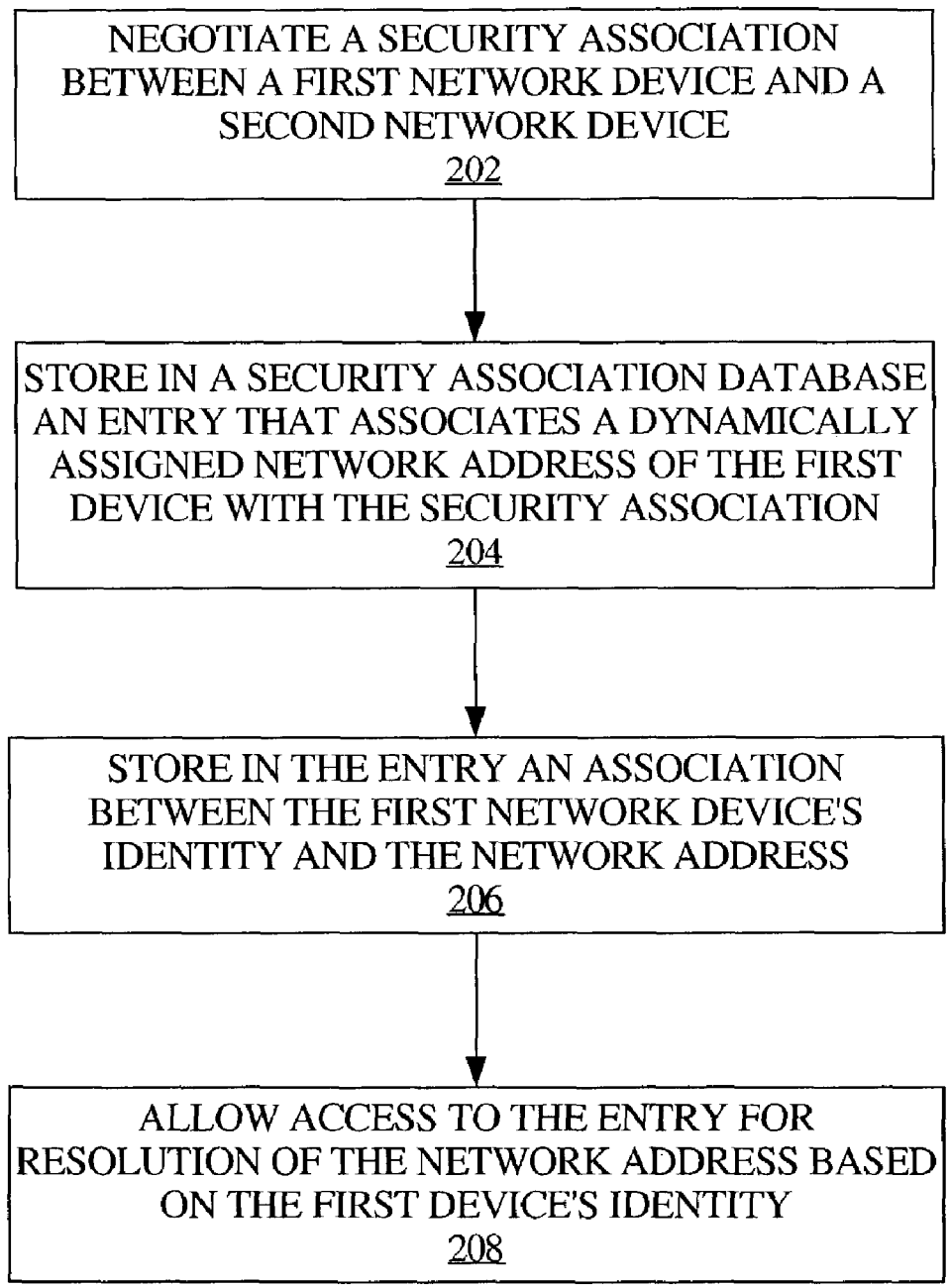
FIG. 2 is a flow diagram that illustrates a process for associating a network device's dynamically assigned network address with the network device's identity.

3.1 Process of Associating a Network Device's Dynamically Assigned Address with the Network Device's Identity FIG. 2 is a flow diagram that illustrates a process for associating a network device's dynamically assigned network address with the network device's identity.

At block 202, a security association is negotiated between a network device and a second network device. For example, an ISAKMP (Internet Security Association and Key Management Protocol) SA is negotiated between hub router 102a (FIG. 1A) and spoke router 106 (FIG. 1A) using the IKE (Internet Key Exchange) protocol. In some instances, although not as common, an SA may be negotiated directly between a host H3 behind spoke router 106 and hub router 102a.

Negotiation of an SA is performed as a prelude to secure communications between two network devices. For example, spoke S1 negotiates an SA for secure communications between itself and the second device, such as hub router 102a. This SA applies to secure communications between host H1 behind spoke S1 and the second device. However, in such a scenario, communication between spoke S1 and host H1 would not be encrypted according to the SA. Furthermore, a separate SA may be negotiated directly between a host and the second device. In such a scenario, the host is the secure tunnel endpoint and, therefore, communications are encrypted accordingly all the way to the host device. For example, when a user establishes a IPsec connection from a public network access point, such as with a laptop computer, the laptop serves as the IPsec endpoint.

For another example, spoke router 106 negotiates an SA for secure communications between itself and the second device, such as hub router 102a. This SA typically applies to secure communications between hosts H3, H4, Hn and the second device, if separate SAs were not negotiated between the respective hosts and the second device. However, separate SAs may be negotiated directly between hosts H3, H4, Hn and the second device. In such a scenario, hosts H3, H4, Hn are the secure tunnel endpoints and, therefore, communications are encrypted accordingly all the way to the hosts. Similarly, hub router 102a negotiates an SA for secure communications between itself and another device, which may be applicable to devices behind hub router 102a, such as management station 110 (FIG. 1A).

Once the SA negotiation process is completed, the SA information is stored as an entry in a Security Association Database (SAD) associated with the relevant network device, at block 204. Typically, the SAD resides in memory in the network device, and is continuously updated as existing SAs expire and as new SAs are negotiated with other devices. The SAD may be structured in the form of SAD 120 of FIG. 1A or SAD 160 of FIG. 1B. The SAD entry for a given SA for a given network device includes the SA information in association with the destination IP address of the network device. Furthermore, the SAD may include respective entries for SAs that were negotiated between associated hosts and other devices. For example, SAD 160 (FIG. 1A) includes SA information for each of hosts H3, H4, Hn for which an SA has been negotiated. Each respective SA entry includes the current IP address, dynamically assigned or otherwise, for the respective host H3, H4, Hn.

Furthermore, SA information that is negotiated by hub router 102a is stored in SAD 120 (FIG. 1A), for secure communication between router 102a and other network devices. This SA typically applies to devices behind router 102a, such as management station 110 (FIG. 1A), if no separate SA is negotiated by management station 110. For example, an SA negotiated by hub router 102a and spoke router 106 (FIG. 1A) may apply to secure communication between management station 110 and hosts H3, H4, Hn.

At block 206, an association between the network device's identity and the network device's network address is stored in the SAD entry. In an embodiment, the association between the device's identity and its address is based on an identity authentication process, which is described in detail below.

Often, secure communication implementations, such as VPN tunnels, require users to authenticate themselves to a security gateway, such as hub router 102a (FIG. 1A), using an identity authentication mechanism. For example, as part of a process of remotely logging onto a secure enterprise network, such as with a home office user logging into a corporate network, a user is prompted for a pre-shared key, such as a password. Pre-shared keys may be associated with an individual user or with groups of users. In a case in which the pre-shared key is personal to a specific user, once a user provides the key to a security gateway, the security gateway can authenticate the identity of the user associated with the network device.

The security gateway now knows the identity of the user and the identity of the network device from which the user is logging on to the network. Hence, the security gateway has sufficient information to map the identity associated with the network device with the current network or IP address of the device. Depending on the identity authentication mechanism used, the nature of the identity may vary. In an embodiment, the network device's identity is defined according to an IPsec identification type, which is described in more detail below.

The network device identity information is stored in an SA entry in the SAD for the particular network device. Once an entry exists within the SAD that includes the device identity in association with the device's current IP address, sufficient information is present to respond to resolution requests. Resolution modules 122 and 162 (FIG. 1A) operate to receive resolution requests. Based on information received in the request, resolution modules 122 and 162 determine the SAD entry that is associated with the device of interest and extract the information requested from the entry. This process is described in detail in reference to FIG. 3.

For example, spoke router 106 and hub router 102a (FIG. 1A) negotiate an IPsec security association to communicate securely. An entry is stored in SAD 160 of hub router 102a, which includes parameters relating to the SA and includes the IP address of router 106. Trusted identity information, such as the certificate distinguished name of router 106, is provided to router 102 typically as part of the negotiation process. Resolution module 122 of router 102a adds the identity information to the SAD entry, based on the information that it received from router 106. Resolution module 122 receives a request for the IP address of router 106, where the request includes information associated with an IPsec identification type. For example, the request includes the certificate distinguished name associated with the router 106, such as "CN=router.cisco.com, OU=Core IP Engineering, O=cisco.com." In response, resolution module 122 locates the appropriate SAD entry that is associated with router 106, based on the provided identifying information. Resolution module 122 then reads the entry to determine the requested information, which in this example is the IP address of router 106.

For another example, host H1 and hub router 102a negotiate an IPsec security association to communicate securely. An entry is stored in SAD 160 of hub router 102a, which includes parameters relating to the SA and includes the IP address of host H1, which is the same as the address of spoke S1. Further, host H1 is required to authenticate its identity with hub router 102a. A user associated with host H1 provides a user password to hub router 102a for identity authentication purposes. The user password is associated with user identifying information, such as a fully qualified user name (ID_USER_FQDN), and is transmitted from the IP address of host H1. Resolution module 122 of hub router 102a adds the identity information to the SAD entry, based on the information that it received from host H1. For example, by presenting a valid password, the user has verified a credible identification to hub router 102a. Therefore, the identifying information is stored in the appropriate entry of the SAD 120, which is the entry for the SA associated with host H1/spoke S1 and hub router 102a.

Continuing in reference to FIG. 2, at block 208, access is allowed to the database entry for resolution of information associated with a given network device. For example, if an enterprise network administrator or management application at management station 110 (FIG. 1A) wants to know the IP address of a host, say host H1, on which a particular user is working, the administrator or application can issue a command to hub router 102a requesting a name resolution. The request includes the fully-qualified username string (ID_USER_FDQN) of the user, such as "username@cisco.com." Hub router 102a (FIG. 1A) has negotiated an SA with host H1 and authenticated the user's identity via a personal password associated with "username@cisco.com." Therefore, according to the process described above, the SAD 120 (FIG. 1A) has an entry that associates the user's ID_USER_FDQN with the dynamically assigned IP address of host H1, which is the same as spoke S1. Resolution module 122 (FIG. 1A) resolves the ID_USER_FDQN to the associated IP address by locating the entry in SAD 120, and returns the current IP address from which "username" is currently working.

For another example, if an enterprise network administrator at management station 110 wants to know the IP address of spoke router 106, the administrator can issue a command to hub router 102a requesting a name resolution. The request includes the distinguished certificate name string (ID_DER_ASN1_DN) of router 106, such as "CN=router.cisco.com, OU=Core IP Engineering, O=cisco.com." Hub router 102a has negotiated an SA with router 106 and authenticated the identity via the distinguished certificate name string. Therefore, according to the process described above, the SAD 120 has an entry that associates the distinguished certificate name string with the dynamically assigned IP address of router 106. Resolution module 122 resolves the distinguished name to the associated IP address by locating the entry in SAD 120, and returns the current IP address associated with the distinguished name.

A resolution mechanism and process as described herein is extendible. According to one embodiment, the pertinent device identity and address information stored in a network device, such as hub router 102a, can be copied to other network devices, such as router 102n (FIG. 1A). Further, the pertinent information in router 102n can be copied to hub router 102a. Multiple network devices that store such information can cross-populate respective databases. Hence, network devices spread out across the Internet may collect and compile such information from source devices and, therefore, have the ability to function as name resolution servers. The information can be extracted from the respective SADs and stored in a separate database to protect the integrity of the IPsec SA information. An extended IDNS (IKE Identity Name Service) system can be based on a hierarchy, similar to conventional domain name services. For example, identity information associated with multiple network devices may be arranged in a hierarchy based first on organization (O), then organizational unit (OU), then common name (CN).

3.1.1 Identity Information

In an embodiment, the types of network device identity information correspond to IPsec identification types ("ID types"). Hence, SADs 120 and 160 (FIG. 1A) are enhanced to be flexible enough to store information associated with all such ID types. Currently standard IPsec identification types are described in RFC 2407 entitled "The Internet IP Security Domain of Interpretation for ISAKMP," available from the Network Working Group of the IETF (Internet Engineering Task Force) and which is incorporated by reference in its entirety for all purposes as if fully set forth herein.

The ID types listed in RFC 2407 are as follows:

ID_IPV4_ADDR, an IPv4 address;
ID_FQDN, a fully-qualified domain name string (e.g., foo.bar.com);
ID_USER_FQDN, a fully-qualified username string (e.g., piper@foo.bar.com);
ID_IPV4_ADDR_SUBNET, a range of IPv4 addresses (address and mask);
ID_IPV4_ADDR_RANGE, a range of IPv4 addresses (beginning and ending addresses);
ID_IPV6_ADDR, an IPv6 address;
ID_IPV6_ADDR_SUBNET, a range of IPv6 addresses (address and mask);
ID_IPV6_ADDR_RANGE, a range of IPv6 addresses (beginning and ending addresses);
ID_DER_ASN1_DN, a binary DER encoding of an ASN.1 X.500 Distinguished Name;
ID_DER_ASN1_GN, a binary DER encoding of an ASN.1 X.500 General Name;
ID_KEY_ID, customizable to specify/identify use of pre-shared key.

Any one of the foregoing ID types can be used to identify a network device or a user at a network device. Therefore, according to embodiments, identity information according to any of the ID types can be provided in a resolution request for resolving a network address based on the provided identity information. Likewise, to determine a user at a specific network address, a resolution request can be provided which includes network address information, for resolving an IPsec identity of the user based on the provided address information.

3.1.2 Identity Authentication

Block 206 of FIG. 2 relies on the availability of an association between a network device's identity and its address. Preferably, this association is based on an identity authentication process. Hence, the association is trusted or secure, due to the inherent security of such an authentication process.

In one embodiment, the association between a network device's identity and its address is based on the Internet Key Exchange (IKE) Extended Authentication (XAUTH) protocol. Although not an official standard, XAUTH is widely used as an identity authentication protocol. XAUTH is described in an Internet Draft entitled "draft-beaulieu-ike-xauth-02.txt." Performance of an XAUTH-based process is considered an optional extension to the IKE process. In an XAUTH-based authentication, identity credentials and authentication information are exchanged, through which the identity is verified via the authentication information. XAUTH is particularly useful in group key scenarios, where a user or network device identity becomes ambiguous because the user or device is unidentifiable beyond the course granularity of the group within which a specific access key is shared.

The XAUTH protocol, and associated techniques, allow IPsec's IKE protocol to support extended authentication mechanisms like two-factor authentication, challenge/response and other remote access unidirectional authentication mechanisms. XAUTH authentication processes utilize ISAKMP to transfer a user's authentication information, such as name and password, to a network device in a secured ISAKMP message. The network device can then use the appropriate protocol, such as RADIUS or SecurID, to authenticate the user.

Therefore, a remote access system can be configured to require an XAUTH authentication process to complete a network access process. For example, a user at host H1 that is negotiating an SA with hub router 102a (FIG. 1A) for secure communications between the two devices, is required to provide identifying and authenticating information to hub router 102a, such as user name and pre-shared key or password. As a result of this authentication process, hub router 102a knows identity information associated with network devices with which it has authenticated respective identities. For example, hub router 102a knows the identity information associated with and provided by host H1 during the authentication process. Hub router 102a stores the identity information in association with the SA negotiated with host H1/spoke S1 in SAD 120, and therefore has a trusted mapping between the identity and network address of host H1/spoke S1. Hence, resolution module 122 of router 102a can provide resolution of information associated with host H1/spoke S1, to management station 110 (FIG. 1A) for example.

In one embodiment, the association between a network device's identity and its address is based on a Pre-IKE Credential Provisioning Protocol (PIC). PIC provides a method to bootstrap IPsec authentication via an Authentication Server (AS) and user authentication mechanisms such as RADIUS. Typical IKE implementations require "strong" authentication, however, user passwords are considered relatively "weak." PIC provides a mechanism that enables use of IPsec security associations based on legacy user authentication methods, such as shared key exchanges. PIC is described in an Internet Draft entitled "draft-ietf-ipsra-pic-06.txt."

A PIC authentication process happens before IKE. A client machine, such as spoke router 106 (FIG. 1A), communicates with an AS using a key exchange protocol in which only the server is authenticated. Derived keys are then used to securely authenticate the client user. Once the user is authenticated, the client machine obtains credentials, based on strong keys, from the AS. The credentials are used to authenticate the client machine in subsequent IKE exchanges.

An authentication server may be co-located with the security gateway. For example, hub router 102a (FIG. 1A) and spoke router 106 may include AS functionality. Alternatively, an IPsec endpoint, such as routers 102a and 106, may be communicatively and securely coupled to a separate AS, such as through an IPsec connection. Regardless of the communication configuration, an IPsec endpoint should have access to the identity information related to client machines to which the endpoint is associated. For example, if host H1/spoke S1 is using PIC to authenticate its identity prior to negotiation of an IPsec SA with hub router 102a, resolution module 122 (FIG. 1A) is able to obtain host H1/spoke S1 identity information used to obtain the strong credentials. Resolution module 122 can then store the identity information obtained from the PIC-based authentication process in SAD 120 (FIG. 1A), in association with an associated SA between host H1 and router 102a. Hence, resolution module 122 can serve information resolution requests related to host H1/spoke S1 based on this information stored in SAD 120.

Other authentication mechanisms, processes and protocols may be used to provide and obtain the identity information that is associated with a given network device, in conjunction with device's network address, which is stored in association with one or more respective SAs associated with the device.

One factor that may be considered when determining an appropriate authentication mechanism for obtaining the desired identity information in conjunction with associated network address information is the degree of granularity that is desired and provided by an implementation of the techniques described herein. For example, if resolution at a user level is desired, for example, a user of host H1/spoke S1, an implementation may rely on XAUTH and a pre-shared user key to provide the level of identity information desired since XAUTH facilitates authentication at the level of a user. Furthermore, if resolution at a user group level is desired, an implementation may rely on XAUTH and a pre-shared user group key to provide the level of identity information desired since XAUTH facilitates such fine-grained authentication, even when a group key is used.

However, if resolution is desired at the level of a non-host IPsec endpoint, such as with the support that spoke router 106 provides to hosts H3, H4, Hn, then an implementation may not need an authentication mechanism in addition to an IPsec IKE process. For example, a certificate distinguished name associated with router 106, which is used by router 106 in IKE processes, is sufficient identification information to populate an SAD 120, 160 for resolution purposes. Thus, use of XAUTH or a similar authentication mechanism is not necessary to associate identity information with network address information.

3.2 Process of Resolving Information Associated with a Network Device

Figure 3:
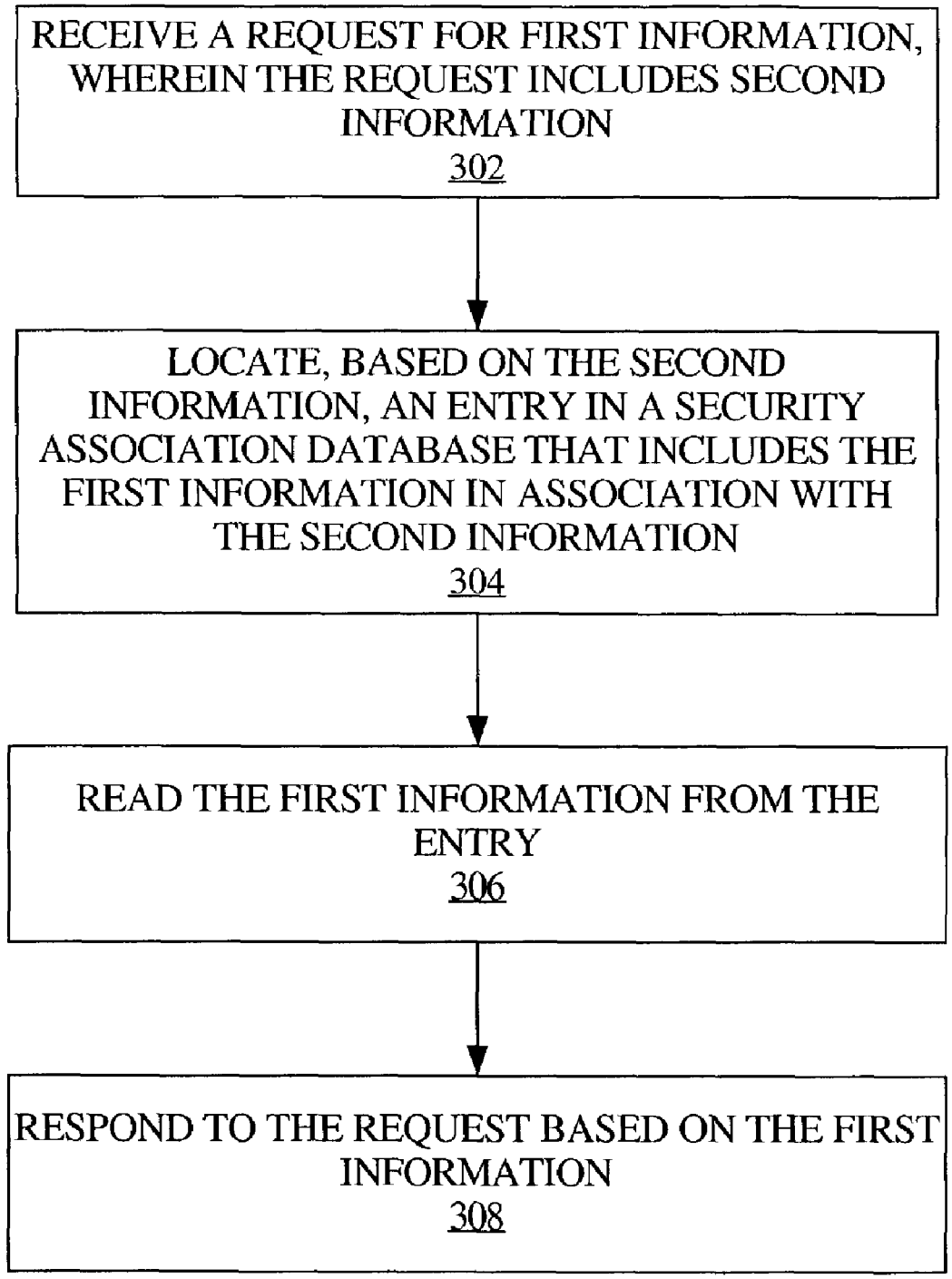
FIG. 3 is a flow diagram that illustrates a process for resolving information associated with a network device.

FIG. 3 is a flow diagram that illustrates a process for resolving information associated with a network device.

At block 302, a request for first information is received. The request includes second information. For example, a request for the dynamic IP address of host H1, which is typically the same IP address associated with spoke S1, is received by hub router 102a from management station 110 (FIG. 1A). The request includes the fully-qualified user name associated with a user of host H1. For another example, the request is for the distinguished certificate name associated with host H1/router S1, and includes the known dynamic IP address of host H1. For one more example, the request is for the dynamic IP address assigned to host H3, which is acting as an IPsec endpoint and has therefore negotiated an SA with hub router 102a, and includes the distinguished certificate name associated with host H3.

At block 304, an entry in a security association database, which includes the requested first information in association with the second information, is located based on the second information. For example, resolution module 122 of hub router 102a accesses SAD 120 (FIG. 1A). Using the provided second information, such as a FQDN, distinguished certificate name, or any other IPsec identification type, the entry associated with the device of interest is located. If the request at block 302 requested the IP address of host H1/spoke S1 based on its distinguished certificate name, resolution module locates the SA entry associated with host H1/spoke S1 in SAD 120 using the distinguished certificate name provided in the request.

The process for locating the appropriate entry, block 304, can utilize any conventional database search mechanism or process. For example, if SAD 120 (FIG. 1A) is implemented as a data table with rows and columns, a search of the rows based on the value in the relevant column, such as an ID_type column, is performed. Searching the ID_type or similar column of SAD 120 for a value equal to the second information received with the request, returns at least the value of the relevant column from the relevant entry or row, such as an IP_address column. For another example, in instances in which the IP address of the device is known and included in a request for some other information associated with the device, resolution module 122 (FIG. 1A) can use the value in the SPI field of SAD 120 to locate the appropriate entry in which the desired information is stored.

At block 306, the first information is read from the entry located at block 304. Thus, whether the entry is located via a scan of a column of a table, via an index, or otherwise, the information that was requested is located and read from the entry.

At block 308, the request is responded to based on the first information requested, by resolution module 122 of hub router 102a (FIG. 1A), for example. For example, the response includes the first information, which was located in SAD 120 (FIG. 1A) and read at block 306.

A system and method for providing a secure name resolution service for network devices is described. Broadly, such a name resolution service is facilitated by storing authenticated identity information in association with an authenticated network address, both with respect to an endpoint device employing a security protocol. A more secure resolution process is provided in relation to conventional domain name resolution services. This is due to the completion of a cryptographic identity verification process, such as IKE, XAUTH, PIC, a combination of these, or any other trusted or secure identity verification process. Consequently, a resolution requestor can be confident that the network device is not only "who" it claims to be, but also that it is "where" on a network it claims to be, due to the binding of the device's cryptographic identity with its network address. Hence, such a system is less likely to return incorrect information in response to a name or other resolution request than with conventional name resolution services.

A prior approach to network device identity resolution uses DNS Security (DNSSEC), which is a set of extensions to DNS that provide authenticity to name resolution processes. However, there are significant features provided by the techniques described herein that differ from DNSSEC. Examples of such features of the present techniques are as follows:

(1) Information, including dynamic address information, is updated dynamically;
(2) Information is obtained from an existing source, for example, an IKE SAD;
(3) Information is obtained through leveraging of existing protocols, such as IPsec; and
(4) The authenticity of the device identity information is assured from the start since the network addresses are cryptographically tied to the device identity, rather than by simply securing DNS resolution messages as with DNSSEC.

4.0 IMPLEMENTATION MECHANISMS

Hardware Overview

Figure 4:
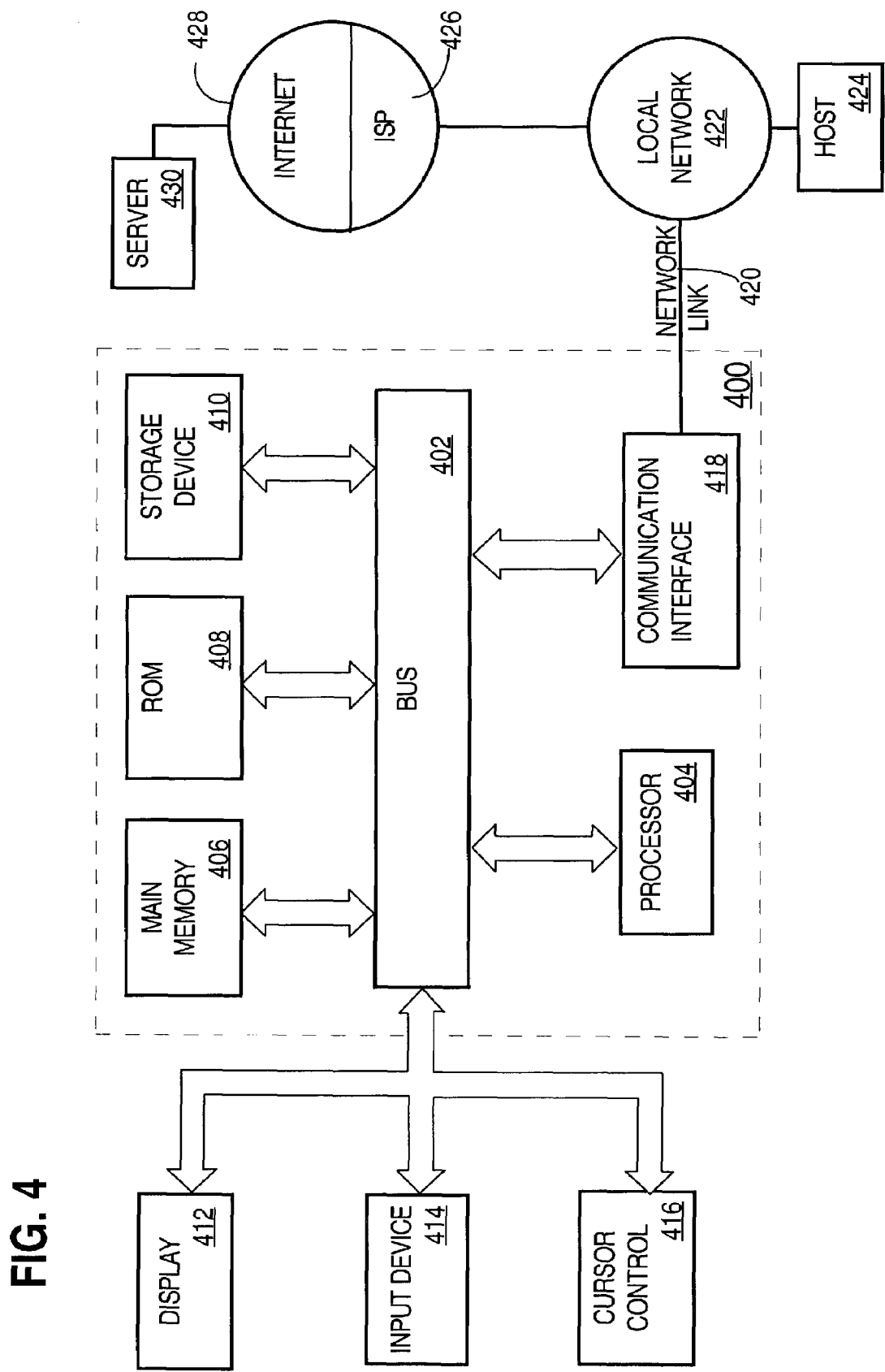
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for providing a secure information resolution service for network devices. According to one embodiment of the invention, a secure information resolution service for network devices is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for the techniques and functions that are described herein.

The received code may be executed by processor 404 as it is received, and/or stored in storage device 410, or other non-volatile storage for later execution. In this manner, computer system 400 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. For example, although embodiments of the invention are described in the context of IPsec, other secure communication protocols and associated databases can be used to implement the resolution techniques described herein. For another example, although XAUTH and PIC are specifically described as identity authentication mechanisms that could provide relevant network device identity information, other identity authentication or verification mechanisms can be used, preferably trusted or secure mechanisms. For another example, although current IPsec device identification types are described as allowable, other identification types may be used to identify a network device. The specification and drawings are, accordingly, to be regarded in an illustrative rather than a restrictive sense.

One possible application of the techniques described herein is application in an SSL (Secure Socket Layer) process. SSL typically provides authentication of a server, such as with on-line banking. However, SSL can optionally provide client authentication if a client presents a certificate in an SSL process. Therefore, network device resolution as described herein may be implemented to determine the network address of an SSL client based on an SSL authentication process.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for resolving information associated with a particular network device, the method comprising the computer-implemented steps of:

at a first network device, storing, in each entry of a plurality of entries in a security association database, at least: (a) a network address of some network device, (b) a security association comprised of a set of Internet Protocol security (IPSec) parameters that have been negotiated between that network device and another network device, and (c) a security parameter index for said security association;

the first network device utilizing one or more of said security associations identified in said plurality of entries of said security association database to participate in secure communications with one or more other devices;

the first network device adding to a particular entry of said plurality of entries in the security association database, said particular entry storing a particular network address and a particular security association for a particular network device, authenticated identity information of the particular network device;

wherein the particular network address is a dynamically assigned network address;

wherein the authenticated identity information is an identity, other than the particular network address and the particular security association, that has been verified to belong to the particular network device based at least on authentication information other than the identity;

the first network device receiving, from a client that does not have the particular network address of the particular network device, a request for the network address of the particular network device, wherein the request includes at least a part of the authenticated identity information of the particular network device;

the first network device locating, based on the at least a part of the authenticated identity information, the particular entry in the security association database that includes the particular network address of the particular network device; and the first network device responding to the request with the particular network address of the particular network device.

2. The method of claim 1, wherein the security association database is an IPsec security association database (SAD) in conformance with RFC 2401, in that the security association database (a) supports an IPSec implementation and (b) includes at least the minimal data items required to support the IPSec implementation.

3. The method of claim 1, wherein the at least a part of the authenticated identity information in said request comprises an Internet Key Exchange identification type.

4. The method of claim 1, wherein
the at least a part of the authenticated identity information in said request is based on an Internet Key Exchange Extended Authentication (XAUTH) protocol.

5. The method of claim 1, wherein
the authenticated identity information is based on a Pre-IKE Credential (PIC) provisioning protocol.

6. The method of claim 1, further comprising the first network device negotiating the particular security association between the first network device and the particular network device.

7. The method of claim 6, wherein the authenticated identity information is provided by the particular network device to the first network device during said step of negotiating the particular security association.

8. The method of claim 1, wherein the authenticated identity information comprises one or more of a certificate distinguished name, a fully qualified user name, a fully qualified domain name, a binary DER encoding of an X.500 Distinguished Name, or a binary DER encoding of an X.500 General Name.

9. The method of claim 1, further comprising the first network device authenticating the particular network device, wherein said authenticating comprises the particular network device providing the authenticated identity information to the first network device.

10. The method of claim 1, wherein the step of the first network device adding the authenticated identity information to the particular entry comprises the first network device receiving the authenticated identity information from a second network device at which the authenticated identity information is stored in a second security association database.

11. The method of claim 10, wherein the authenticated identity information was provided by the particular network device to the second network device while the particular network device and the second network device negotiated the particular security association.

12. A computer-readable medium carrying one or more sequences of instructions for resolving information associated with a particular network device, which instructions, when executed by one or more processors, cause the one or more processors to carry out the steps of:
at a first network device, storing, in each entry of a plurality of entries in a security association database, at least: (a) a network address of some network device, (b) a security association comprised of a set of Internet Protocol security (IPSec) parameters that have been negotiated between that network device and another network device, and (c) a security parameter index for said security association;
the first network device utilizing one or more of said security associations identified in said plurality of entries of said security association database to participate in secure communications with one or more other devices;
the first network device adding to a particular entry of said plurality of entries in the security association database, said particular entry storing a particular network address and a particular security association for a particular network device, authenticated identity information of the particular network device;
wherein the particular network address is a dynamically assigned network address;
wherein the authenticated identity information is an identity, other than the particular network address and the particular security association, that has been verified to belong to the particular network device based at least on authentication information other than the identity;
the first network device receiving, from a client that does not have the particular network address of the particular network device, a request for the network address of the particular network device, wherein the request includes at least a part of the authenticated identity information of the particular network device;
the first network device locating, based on the at least a part of the authenticated identity information, the particular entry in the security association database that includes the particular network address of the particular network device; and
the first network device responding to the request with the particular network address of the particular network device.

13. The computer readable medium of claim 12, wherein the security association database is an IPsec security association database (SAD) in conformance with RFC 2401, in that the security association database (a) supports an IPSec implementation and (b) includes at least the minimal data items required to support the IPSec implementation.

14. The computer-readable medium of claim 12, wherein the at least a part of the authenticated identity information in said request comprises an Internet Key Exchange identification type.

15. The computer-readable medium of claim 12, wherein
the at least a part of the authenticated identity information in said request is based on an Internet Key Exchange Extended Authentication (XAUTH) protocol.

16. The computer-readable medium of claim 12, wherein
the at least a part of the authenticated identity information in said request is based on a Pre-IKE Credential (PIC) provisioning protocol.

17. The computer-readable medium of claim 12, wherein the one or more sequences of instructions further causes one or more processors at to perform the step of the first network device negotiating the particular security association between the first network device and the particular network device.

18. The computer-readable medium of claim 17, wherein the authenticated identity information is provided by the particular network device to the first network device during said step of negotiating the particular security association.

19. The computer-readable medium of claim 12, wherein the authenticated identity information comprises one or more of a certificate distinguished name, a fully qualified user name, a fully qualified domain name, a binary DER encoding of an X.500 Distinguished Name, or a binary DER encoding of an X.500 General Name.

20. The computer-readable medium of claim 12, further comprising one or more sequences of instructions which, when executed, cause one or more processors to perform the step of the first network device authenticating the particular network device, wherein said authenticating comprises the particular network device providing the authenticated identity information to the first network device.

21. The computer-readable medium of claim 12, wherein the step of the first network device adding the authenticated identity information to the particular entry comprises the first network device receiving the authenticated identity information from a second network device at which the authenticated identity information is stored in a second security association database.

22. The computer-readable medium of claim 21, wherein the authenticated identity information was provided by the particular network device to the second network device while the particular network device and the second network device negotiated the particular security association.

23. A first network device for resolving information associated with a particular device, the first network device comprising:
   one or more processors coupled to a memory;
   means for storing, at the first network device, in each entry of a plurality of entries in a security association database, at least: (a) a network address of some network device, (b) a security association comprised of a set of Internet Protocol security (IPSec) parameters that have been negotiated between that network device and another network device, and (c) a security parameter index for said security association;
   means for the first network device utilizing one or more of said security associations identified in said plurality of entries of said security association database to participate in secure communications with one or more other devices;
   means for the first network device adding to particular entry of said plurality of entries in the security association database, said particular entry storing a particular network address and a particular security association for a particular network device, authenticated identity information of the particular network device;
   wherein the particular network address is a dynamically assigned network address;
   wherein the authenticated identity information is an identity, other than the particular network address and the particular security association, that has been verified to belong to the particular network device based at least on authentication information other than the identity;
   means for the first network device receiving, from a client that does not have the particular network address of the particular network device, a request for the network address of the particular network device, wherein the request includes at least a part of the authenticated identity information of the particular network device;
   means for the first network device locating, based on the at least a part of the authenticated identity information, the particular entry in the security association database that includes the particular network address of the particular network device; and
   means for the first network device responding to the request with the particular network address of the particular network device.

24. The first network device as recited in claim 23, wherein the at least a part of the authenticated identity information in said request is based on an Internet Key Exchange (IKE) Extended Authentication (XAUTH) protocol.

25. The first network device as recited in claim 23, wherein the at least a part of the authenticated identity information in said request is based on a Pre-IKE Credential (PIC) provisioning protocol.

26. The first network device as recited in claim 23, wherein the security association database is an IPsec security association database (SAD) in conformance with RFC 2401, in that the security association database (a) supports an IPSec implementation and (b) includes at least the minimal data items required to support the IPSec implementation.

27. The first network device of claim 23, wherein the authenticated identity information comprises one or more of a certificate distinguished name, a fully qualified user name, a fully qualified domain name, a binary DER encoding of an X.500 Distinguished Name, or a binary DER encoding of an X.500 General Name.

28. The first network device as recited in claim 23, further comprising means for the first network device negotiating the particular security association between the first network device and the particular network device.

29. The first network device as recited in claim 28, wherein the authenticated identity information is provided by the particular network device to the first network device during said step of negotiating the particular security association.

30. The first network device as recited in claim 23, further comprising means for the first network device authenticating the particular network device, wherein said authenticating comprises the particular network device providing the authenticated identity information to the first network device.

31. The first network device as recited in claim 23, wherein the means for the first network device adding the authenticated identity information to the particular entry comprises means for the first network device receiving the authenticated identity information from a second network device at which the authenticated identity information is stored in a second security association database.

32. The first network device as recited in claim 31, wherein the authenticated identity information was provided by the particular network device to the second network device while the particular network device and the second network device negotiated the particular security association.

33. A first network device that can resolve information associated with a particular network device, the first network device comprising:
   a network interface;
   a processor coupled to the network interface and receiving network messages from the network through the network interface;
   a computer-readable medium carrying one or more sequences of instructions for resolving information associated with a particular network device, which instructions, when executed by one or more processors, cause the one or more processors to carry out the steps of:
      at a first network device, storing, in each entry of a plurality of entries in a security association database, at least: (a) a network address of some network device, (b) a security association comprised of a set of Internet Protocol security (IPSec) parameters that have been negotiated between that network device and another network device, and (c) a security parameter index for said security association;
      the first network device utilizing one or more of said security associations identified in said plurality of entries of said security association database to participate in secure communications with one or more other devices;
      the first network device adding to a particular entry of said plurality of entries in the security association database, said particular entry storing a particular network address and a particular security association for a particular network device, authenticated identity information of the particular network device;
         wherein the particular network address is a dynamically assigned network address;

wherein the authenticated identity information is an identity, other than the particular network address and the particular security association, that has been verified to belong to the particular network device based at least on authentication information other than the identity;

the first network device receiving, from a client that does not have the particular network address of the particular network device, a request for the network address of the particular network device, wherein the request includes at least a part of the authenticated identity information of the particular network device;

the first network device locating, based on the at least a part of the authenticated identity information, the particular entry in the security association database that includes the particular network address of the particular network device; and the first network device responding to the request with the particular network address of the particular network device.

34. The first network device as recited in claim 33, wherein at least a part of the authenticated identity information in said request comprises an Internet Key Exchange identification type.

35. The first network device as recited in claim 33, wherein the at least a part of the authenticated identity information in said request is based on an Internet Key Exchange Extended Authentication (XAUTH) protocol.

36. The first network device as recited in claim 33, wherein the at least a part of the authenticated identity information in said request is based on a Pre-IKE Credential (PIC) provisioning protocol.

37. The first network device as recited in claim 33, wherein the security association database is an IPsec security association database (SAD) in conformance with RFC 2401, in that the security association database (a) supports an IPSec implementation and (b) includes at least the minimal data items required to support the IPSec implementation.

38. The first network device of claim 33, wherein the authenticated identity information comprises one or more of a certificate distinguished name, a fully qualified user name, a fully qualified domain name, a binary DER encoding of an X.500 Distinguished Name, or a binary DER encoding of an X.500 General Name.

39. The first network device as recited in claim 33, wherein the computer-readable storage medium further comprising one or more sequences of instructions which, when executed, cause one or more processors to perform the step of the first network device negotiating the particular security association between the first network device and the particular network device.

40. The first network device as recited in claim 39, wherein the authenticated identity information is provided by the particular network device to the first network device during said step of negotiating the particular security association.

41. The first network device as recited in claim 33, wherein the computer-readable storage medium further comprising one or more sequences of instructions which, when executed, cause one or more processors to perform the step of the first network device authenticating the particular network device, wherein said authenticating comprises the particular network device providing the authenticated identity information to the first network device.

42. The first network device as recited in claim 33, wherein the step of the first network device adding the authenticated identity information to the particular entry comprises the first network device receiving the authenticated identity information from a second network device at which the authenticated identity information is stored in a second security association database.

43. The first network device as recited in claim 42, wherein the authenticated identity information was provided by the particular network device to the second network device while the particular network device and the second network device negotiated the particular security association.

* * * * *